(12) United States Patent
Booker

(10) Patent No.: US 9,787,157 B2
(45) Date of Patent: Oct. 10, 2017

(54) ACTUATOR DEVICE AND METHOD OF CONVERTING ROTATIONAL INPUT TO AXIAL OUTPUT WITH ROTARY FLEXURE MECHANISM

(71) Applicant: Hamilton Sundstrand Corporation, Charlotte, NC (US)

(72) Inventor: Jesse W. Booker, Fairfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 613 days.

(21) Appl. No.: 14/445,898

(22) Filed: Jul. 29, 2014

(65) Prior Publication Data
US 2016/0036293 A1    Feb. 4, 2016

(51) Int. Cl.
| | | |
|---|---|---|
| *G02B 7/183* | (2006.01) | |
| *H02K 7/06* | (2006.01) | |
| *F16H 19/06* | (2006.01) | |
| *F16H 49/00* | (2006.01) | |
| *H02K 7/116* | (2006.01) | |

(Continued)

(52) U.S. Cl.
CPC .............. *H02K 7/06* (2013.01); *F16H 19/065* (2013.01); *F16H 49/001* (2013.01); *G02B 7/183* (2013.01); *H02K 7/116* (2013.01); *H02K 37/24* (2013.01); *G02B 7/1827* (2013.01); *G02B 23/00* (2013.01)

(58) Field of Classification Search
CPC ......... F16H 21/16; F16H 21/50; G02B 7/182; G02B 23/00; G02B 7/1827; G02B 7/183; H02K 7/06; F16D 2125/20; F16D 2125/582

USPC ........................... 403/291; 310/80; 267/160; 359/871–873
See application file for complete search history.

(56) References Cited

U.S. PATENT DOCUMENTS 4,060,315 A  *  11/1977  Heinz .................. G02B 7/1827
                                                          248/487
5,177,644 A       1/1993  Stark
(Continued)

FOREIGN PATENT DOCUMENTS

| DE | 102005025619 A1 | 12/2006 | |
|---|---|---|---|
| GB | 2441339 A * | 3/2008 | ............ F16F 15/073 |
| WO | 2004044459 A1 | 5/2004 | |

OTHER PUBLICATIONS

EP Extended search report regarding related EP Application No. 15178599.5; dated Oct. 14, 2015; 7 pages.

*Primary Examiner* — Burton Mullins
(74) *Attorney, Agent, or Firm* — Cantor Colburn LLP

(57) ABSTRACT

An actuator device includes a motor and a reduction device operatively coupled to the motor and oriented about a central axis, the reduction device configured to modify an input angle of rotation provided by the motor to an output angle of rotation. Further included is a rotary flexure mechanism that includes a rotary flexure operatively coupled to an output portion of the reduction device. The rotary flexure mechanism also includes a plurality of flexure blades coupled to the rotary flexure, each of the flexure blades angularly oriented from the central axis. The rotary flexure mechanism further includes a diaphragm flexure pair operatively coupled to the flexure blades, wherein the diaphragm flexure comprises a rotational and in-plane stiffness greater than an axial stiffness resulting in the rotary flexure mechanism being configured to convert a rotational input to an axial translation.

9 Claims, 5 Drawing Sheets

(51) Int. Cl.
*H02K 37/24* (2006.01)
*G02B 7/182* (2006.01)
*G02B 23/00* (2006.01)

(56) References Cited

U.S. PATENT DOCUMENTS

| | | | |
|---|---|---|---|
| 5,233,247 A | 8/1993 | Stark | |
| 5,370,011 A | 12/1994 | Gilges et al. | |
| 6,146,044 A * | 11/2000 | Calvet | F16C 11/12 |
| | | | 267/154 |
| 6,603,229 B1 | 8/2003 | Toye, IV | |
| 8,128,246 B1 * | 3/2012 | Obrien | G02B 7/182 |
| | | | 359/879 |
| 8,210,840 B2 * | 7/2012 | Shilpickandula | B82Y 10/00 |
| | | | 264/293 |
| 8,727,548 B1 * | 5/2014 | Obrien | G02B 7/182 |
| | | | 359/872 |
| 9,297,639 B2 * | 3/2016 | Jackson | G01J 3/0202 |
| 2014/0061420 A1 * | 3/2014 | Kaufman | G02B 7/1822 |
| | | | 248/469 |
| 2014/0260715 A1 * | 9/2014 | Smith | F16H 19/065 |
| | | | 74/25 |

* cited by examiner

ACTUATOR DEVICE AND METHOD OF CONVERTING ROTATIONAL INPUT TO AXIAL OUTPUT WITH ROTARY FLEXURE MECHANISM

BACKGROUND OF THE INVENTION

The embodiments herein relate to actuators and, more particularly, to an actuator having a rotary flexure mechanism, as well as a method of converting rotational input to axial output with the rotary flexure mechanism.

In a wide variety of applications in which precise control of the amount of translation of a linear actuator device is important, it is imperative that the output of a motor be precisely reduced and transferred to the input of the linear actuator device. Optical telescopes are an example of an application with such requirements. In such devices, there is often a need to move a mirror closer to, or further away from, another mirror to focus the image on an imaging device. The step size and range of movement is dependent on the optical system. Certain challenges include requirements related to high axial stiffness, millions of life cycles, as well as thermal and temporal stability. Typically, these requirements are met with a motor and screw design, with the screw being ball, roller, or lead screws, for example. Such designs include a large number of parts, thereby adding weight and complexity to the overall system.

BRIEF DESCRIPTION OF THE INVENTION

According to one embodiment, a linear actuator device includes a motor. Also included is a reduction device operatively coupled to the motor and oriented about a central axis, the reduction device configured to modify an input angle of rotation provided by the motor to an output angle of rotation. Further included is a rotary flexure mechanism. The rotary flexure mechanism includes a rotary flexure operatively coupled to an output portion of the reduction device. The rotary flexure mechanism also includes a plurality of flexure blades coupled to the rotary flexure, each of the plurality of flexure blades angularly oriented from the central axis, wherein the flexure blades has an axial stiffness greater than their bending and twisting stiffnesses. The rotary flexure mechanism further includes a pair of diaphragm flexures operatively coupled to the plurality of flexure blades via an output plate, wherein the diaphragm flexures have a rotational and in-plane stiffness greater than their axial stiffnesses.

According to another embodiment, a method of converting a rotational input to an axial output is provided. The method includes providing the rotational input to a rotary flexure. The method also includes distributing the rotational input from the rotary flexure to a diaphragm flexure pair with a plurality of flexure blades extending between, and coupled to, the rotary flexure and the diaphragm flexures. The method further includes axially translating the diaphragm flexures.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
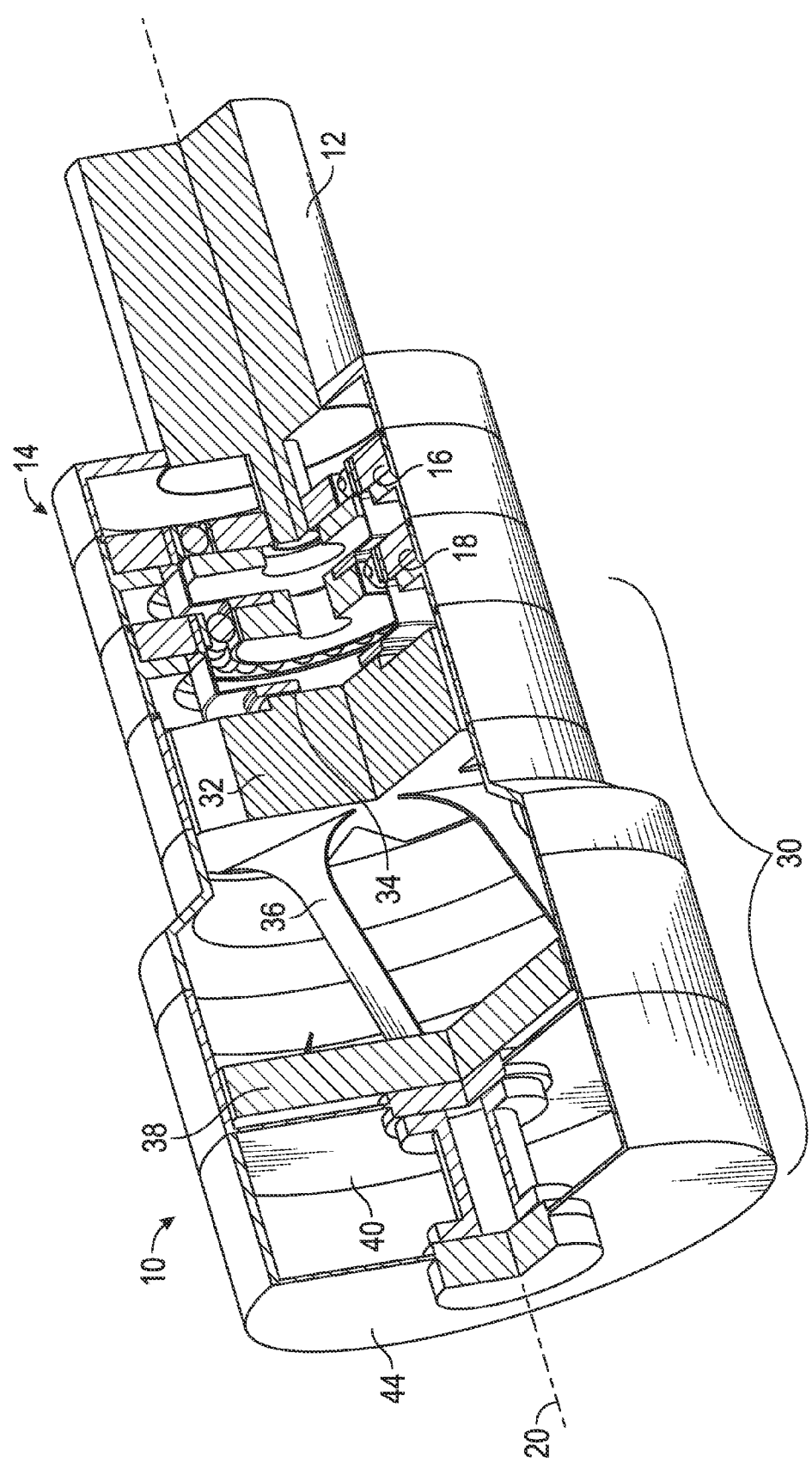
FIG. 1 is a perspective, partial cross-sectional view of an actuator device.

Referring to FIG. 1, an actuator device 10 includes a motor 12 and a reduction device 14 including a first gear reducer 16 and a second gear reducer 18, each of the components arranged coaxially in series about a central axis 20. In an exemplary embodiment, a stepper motor is used as the motor 12 based on a stepper motor's capability of accurately providing a specific, discrete output for a given input.

Figure 8:
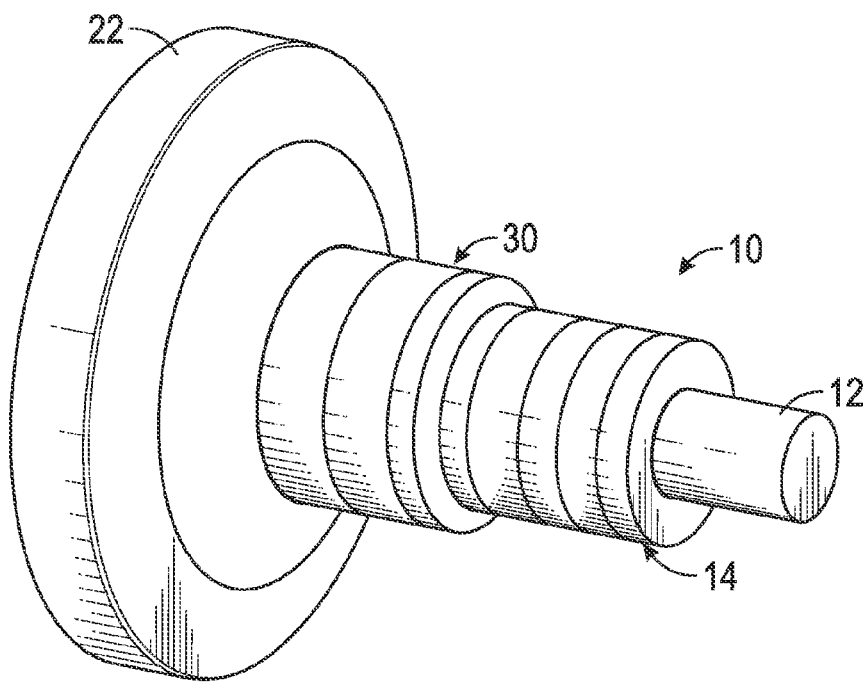
FIG. 8 is a perspective view of the actuator device used in conjunction with a mirror of an optical telescope.

It is contemplated that the actuator device 10 may be utilized in a wide variety of applications that require the conversion of a rotational input to an axial translation output. In an exemplary embodiment, the actuator device is employed in an optical telescope to axially translate a mirror 22 (FIG. 8) over a small range of motion with precision and in a reversible and repeatable manner.

While any gear reduction devices could be used as the gear reducers 16, 18, harmonic drives are utilized in some embodiments for their precision and their ability to minimize backlash. Each of the gear reducers 16, 18 comprises a conventional harmonic drive device which provides a precise gear reduction of 50:1 to 100:1, for example, although the precise gear reduction ratio depends on the particular application of use. In the example provided above, the series combination results in an overall gear reduction ratio ranging from about 2,500:1 to about 10,000:1. The typical harmonic drive device includes an elliptical wave generator acting as an input for the device, a rigid, circular spline which is fixed to a device housing, and a flex spline operating as the output of the device. Harmonic drive devices typically incorporate a natural gear preload which significantly reduces backlash within the drive. An example of a reduction device that may be employed herein is described in U.S. Pat. No. 5,233,247, the disclosure of which is incorporated herein by reference in its entirety.

Figure 2:
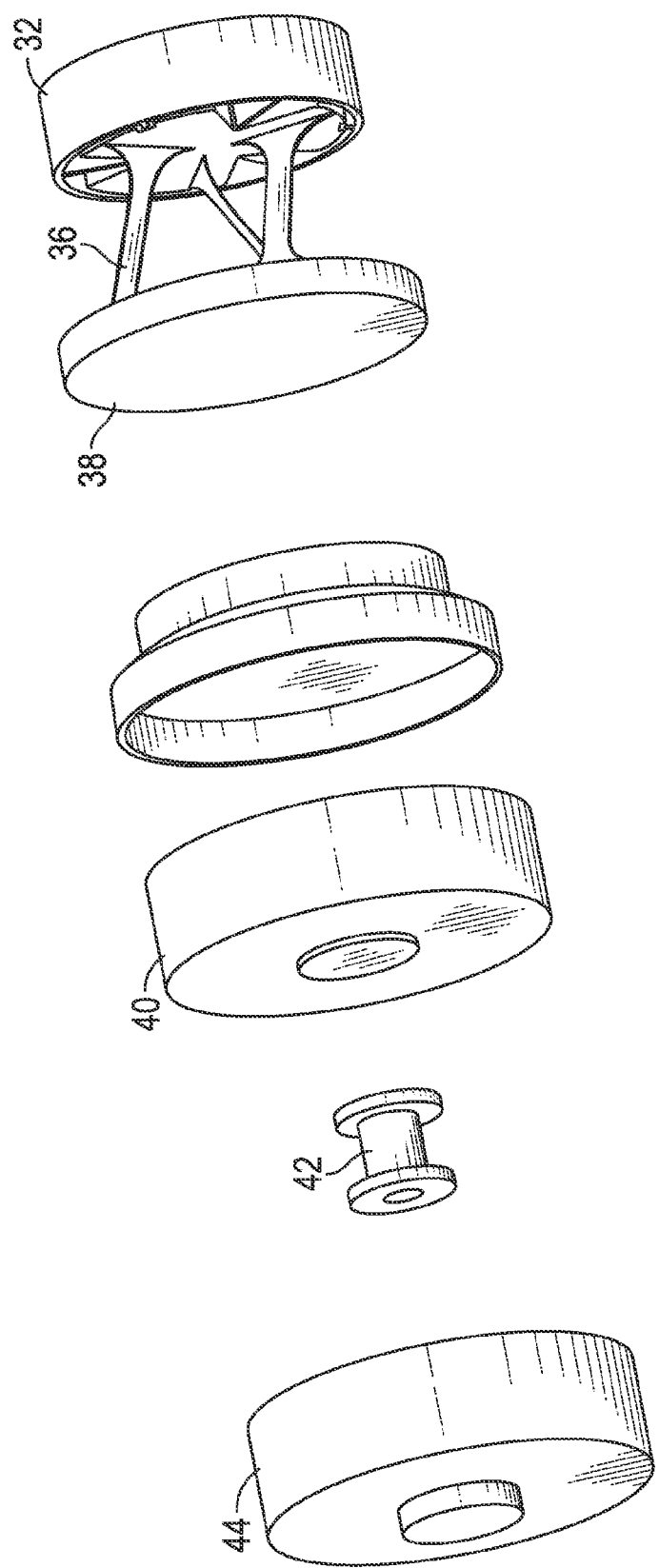
FIG. 2 is an exploded view of a rotary flexure mechanism of the actuator device.
Figure 3:
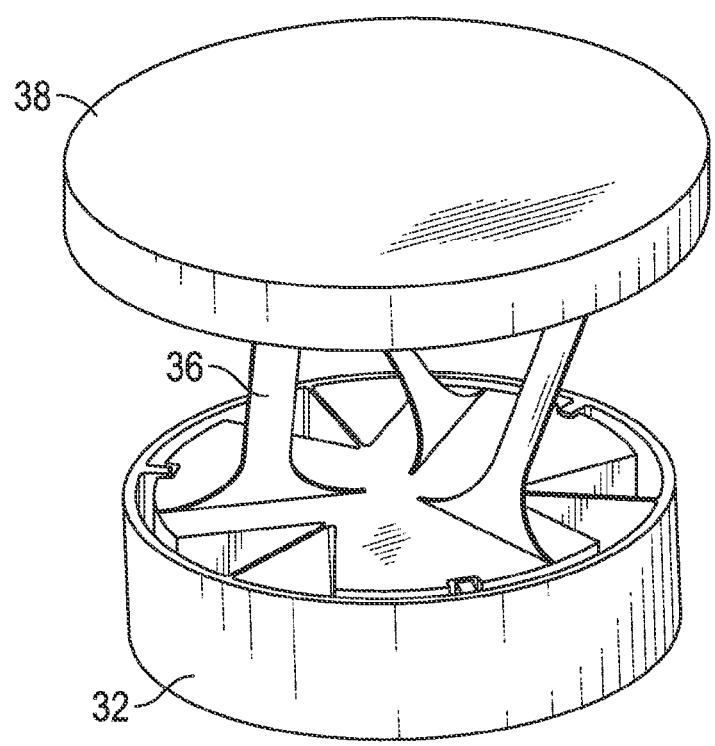
FIG. 3 is a perspective view of the rotary flexure mechanism.
Figure 4:
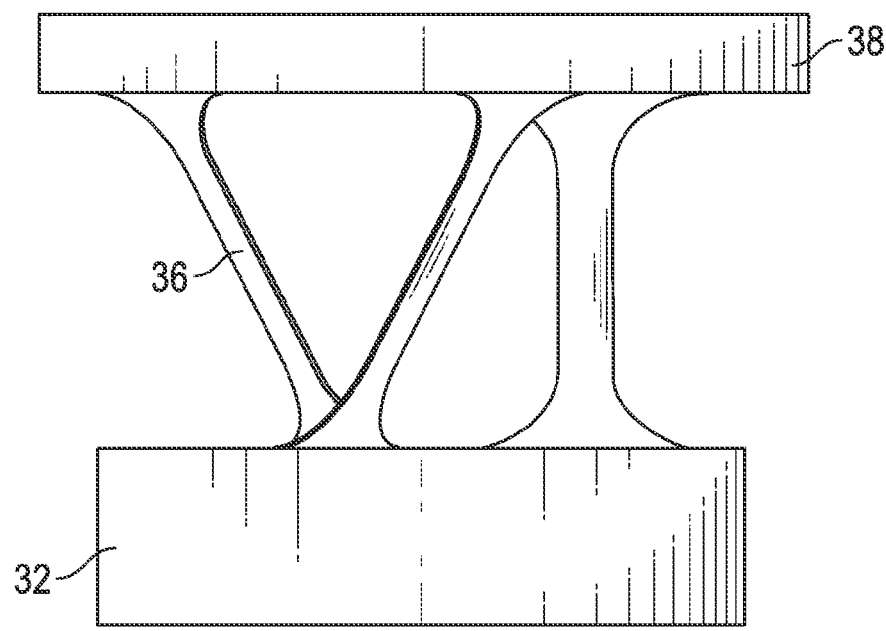
FIG. 4 is an elevation view of the rotary flexure mechanism.

Referring now to FIGS. 2-4, with continued reference to FIG. 1, a rotary flexure mechanism 30 is operatively coupled to the reduction device 14 in a manner that facilitates transfer of a rotational input to an axial translation, as will be described in detail below. The rotary flexure mechanism 30 includes a rotary flexure 32 that is operatively coupled to an output portion 34 of the reduction mechanism 14. Specifically, the second gear reducer 18 includes the output portion 34 that transfers the rotational input initiated by the motor 12 to the rotary flexure 32. The rotary flexure 32 thereby functions as an input for the rotary flexure mechanism 30. The term flexure, as used herein, refers to a mechanical component that is designed to be as stiff as possible (or as stiff as is necessary for the given application)

in certain directions, while being as flexible as possible (or as flexible as is necessary for the given application) in other directions. Such components facilitate a restriction of movement in certain directions, while allowing movement in other directions.

Figure 7:
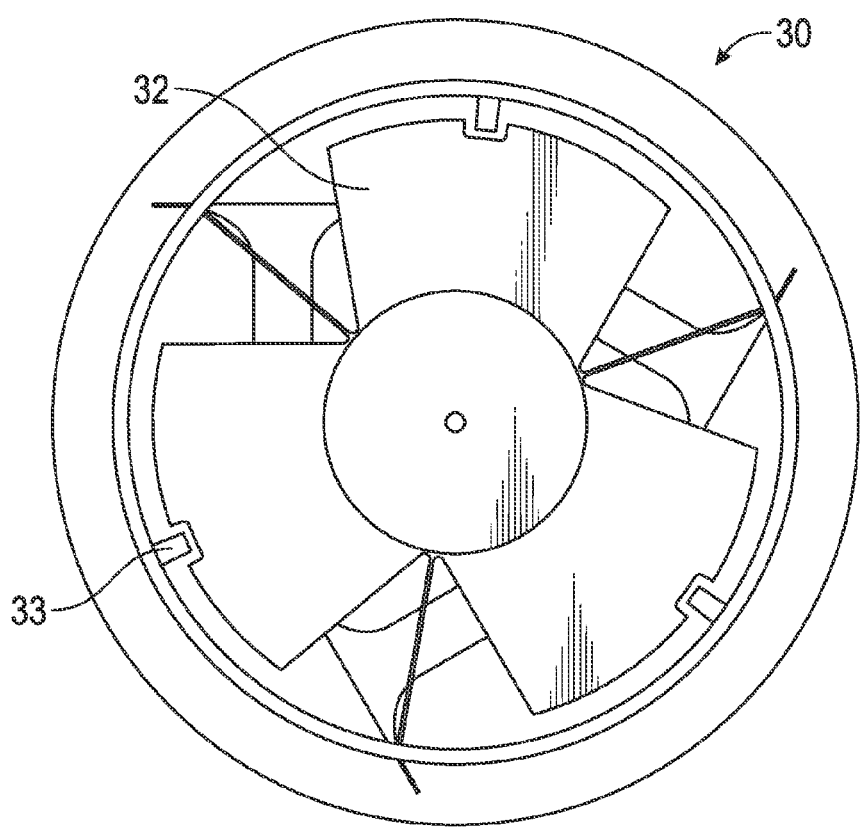
FIG. 7 is an end view of the rotary flexure mechanism.

The rotary flexure 32 is configured to rotate, such that the axial stiffness of the rotary flexure 32 is much greater than the rotational stiffness. In one embodiment, the axial stiffness is at least about 140,000 lb/in, while the rotational stiffness is less than about 5 lb*in/degree. The above-noted examples of stiffness are merely illustrative and are not intended to be limiting. The example is provided to merely allow one to appreciate that the axial stiffness of the rotary flexure 32 is significantly greater than the rotational stiffness. As a result, the rotary flexure 32 rotates in response to a rotational input provided by the motor 12 and the reduction device 14. The rotational movement of the rotary flexure 32 is limited in some embodiments with at least one, but possibly a plurality of stops 33 (FIG. 7) in the form of protrusions that interfere with movement of the rotary flexure 32 at predetermined locations.

The rotary flexure mechanism 30 includes typically a plurality of flexure blades 36 that are each operatively coupled to, or integrally formed with, the rotary flexure 32. The plurality of flexure blades 36 are angularly oriented relative to the central axis 20, such that the blades extend in a non-parallel and non-perpendicular manner relative to the rotary flexure 32 and thereby axis 20 of the actuator device 10. In one embodiment, each of the plurality of flexure blades 36 are oriented at an angle of about 30 degrees relative to the central axis 20. In the illustrated embodiment, three flexure blades 36 are shown, but it is contemplated that more or less blades may be employed. The spacing of the flexure blades may be equidistant from each other, such that the flexure blades are angularly spaced 120 degrees from each other. Furthermore, it is to be appreciated that each flexure blade may actually consist of a plurality of blades such that each illustrated blade is a bundle of smaller flexure blades.

The plurality of flexure blades 36 is operatively coupled at an opposing end to an output plate 38 that provides a structure to which the blades may be mounted. The output plate 38 is coupled to a pair of diaphragm flexures, referenced with numerals 40 and 44 to represent a first flexure 40 and a second flexure 44. The coupling may be by any suitable fastening process, such as simply mechanically fastening the output plate 38 to the diaphragm flexure 40. A diaphragm connector 42 may be disposed between the diaphragm flexures 40, 44 to facilitate coupling of the output plate 38 and the diaphragm flexures 40, 44. The diaphragm flexures 40, 44 are configured to axially translate, such that the rotational and in-plane stiffness of the diaphragm flexure pair 40, 44 is much greater than the axial stiffness. As a result, the diaphragm flexure pair 40, 44 axially translates in response to a rotation of the rotary flexure 32 and forces applied by the flexure blades 36, thereby converting the initial rotational input to an axial translation, which may be employed to translate an object, such as the above-noted mirror 22 of an optical telescope application. Thus, the flexure mechanism 30 is configured such that when rotational motion is input to the rotary flexure 32 it rotates the bottom interface of the flexure blades 36. Since the flexure blades 36 blades are stiff axially and are oriented at an angle to the output plate 38, they exert a force that is at an angle both in-plane and normal to the surface of the output plate 38. Since the output plate 38 is coupled to the diaphragm flexure pair 40, 44, which is stiff in-plane and rotationally, the force from the flexure blades 36 produces axial translation and bending/twisting in the flexure blades 36. The axial translation will be in a positive or negative direction depending on the direction of rotation.

Figure 5:
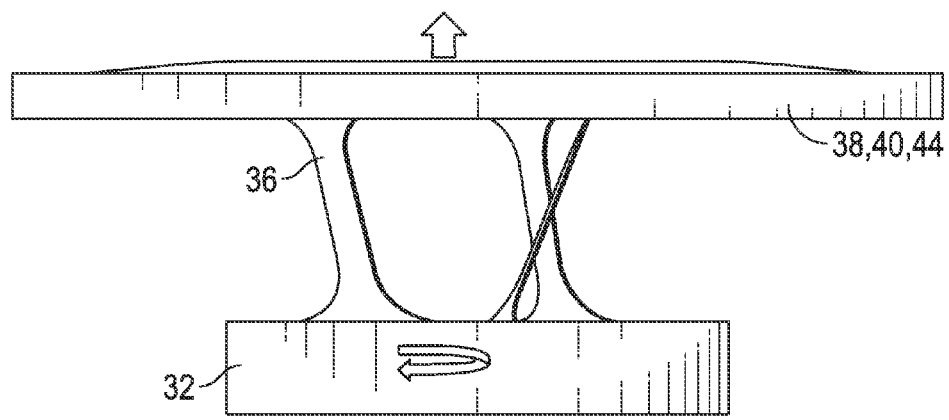
FIG. 5 is an elevation view of the rotary flexure mechanism operating in a first direction.
Figure 6:
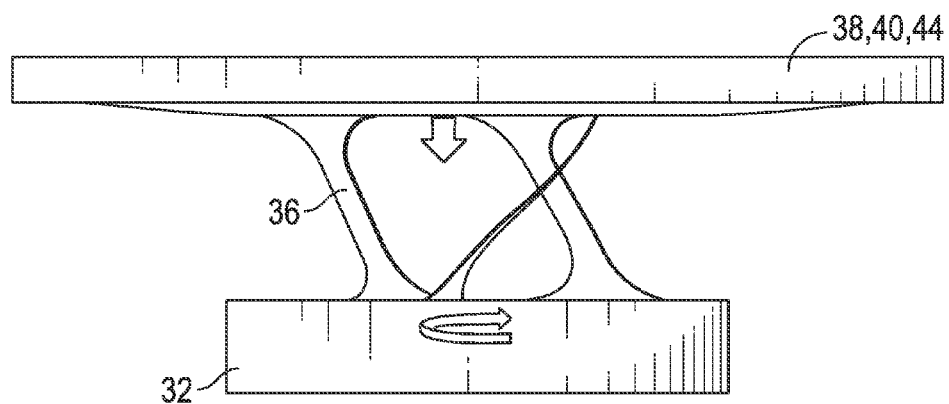
FIG. 6 is an elevation view of the rotary flexure mechanism operating in a second direction.

Referring now to FIGS. 5 and 6, the diaphragm flexures 40 and 44 is schematically illustrated in a simplified view to depict the direction of travel of the diaphragm flexures 40, 44 during operation of the rotary flexure mechanism 30. The diaphragm flexures 40, 44 are configured to move in a first axial direction upon rotation of the rotary flexure 32 and forces exerted by the flexure blades 36 in a first rotational direction (FIG. 5) and the diaphragm flexures 40 and 44 are configured to move in a second axial direction upon rotation of the rotary flexure 32 and forces exerted by the flexure blades 36 in a second rotational direction (FIG. 6). The illustrated embodiment facilitates repeatable, reversible and precise translation of the diaphragm flexure pair 40 and 44.

Advantageously, by eliminating the use of ball, roller or lead screws, the flexures employed in the embodiments described herein reduce friction as well as the associated backlash. Wear of the components is also eliminated, thereby increasing the life and reliability of the overall mechanism. Also avoided are lubricants, thereby reducing the possibility contamination of the moving object. Overall, the actuator device 10 requires fewer parts and reduces the weight and size of the device, as compared to similar mechanisms.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An actuator device comprising:
   a motor;
   a reduction device operatively coupled to the motor and oriented about a central axis, the reduction device configured to modify an input angle of rotation provided by the motor to an output angle of rotation; and
   a rotary flexure mechanism comprising:
      a rotary flexure operatively coupled to an output portion of the reduction device;
      a plurality of flexure blades coupled to the rotary flexure, each of the plurality of flexure blades angularly oriented from the central axis;
      a diaphragm flexure pair operatively coupled to the plurality of flexure blades, wherein the diaphragm flexure pair comprises a rotational and in-plane stiffness greater than an axial stiffness, the diaphragm flexure pair configured to convert a rotational input to an axial translation, wherein the plurality of blades is operatively coupled to an output plate that is mechanically fastened to the diaphragm flexure pair; and
      a diaphragm connector extending between, and operatively coupled to the output plate and the diaphragm flexure pair.

2. The actuator device of claim 1, wherein the rotary flexure comprises an axial stiffness greater than a rotational stiffness.

3. The actuator device of claim 2, wherein the axial stiffness of the rotary flexure is greater than about 140,000 lb/in and the rotational stiffness of the rotary flexure is less than about 5 lb*in/degree.

4. The actuator device of claim 1, wherein the reduction device comprises a first harmonic drive and a second harmonic drive.

5. The actuator device of claim 4, wherein the first harmonic drive comprises a reduction ratio ranging from about 50:1 to about 100:1 and the second harmonic drive comprises a reduction ratio ranging from about 50:1 to about 100:1.

6. The actuator device of claim 1, wherein the rotary flexure comprises at least one stop configured to limit rotational movement of the rotary flexure.

7. The actuator device of claim 1, wherein the diaphragm flexure pair is configured to move in a first axial direction upon rotation of the rotary flexure in a first rotational direction and the diaphragm flexure pair is configured to move in a second axial direction upon rotation of the rotary flexure in a second rotational direction.

8. The actuator device of claim 1, wherein the motor comprises a stepper motor.

9. The actuator device of claim 1, wherein the actuator device is disposed in an optical telescope and the diaphragm flexure pair is operatively coupled to a mirror of the optical telescope to control axial movement of the mirror.

\* \* \* \* \*